(12) United States Patent
Jiang et al.

(10) Patent No.: US 11,716,138 B2
(45) Date of Patent: Aug. 1, 2023

(54) SYSTEMS AND METHODS FOR MONITORING GENERALIZED OPTICAL SIGNAL-TO-NOISE RATIO

(71) Applicant: HUAWEI TECHNOLOGIES CO., LTD., Guangdong (CN)

(72) Inventors: Zhiping Jiang, Kanata (CA); Choloong Hahn, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/503,712

(22) Filed: Oct. 18, 2021

(65) Prior Publication Data
US 2023/0118684 A1 Apr. 20, 2023

(51) Int. Cl.
H04B 17/00 (2015.01)
H04B 10/079 (2013.01)

(52) U.S. Cl.
CPC .............. H04B 10/0795 (2013.01)

(58) Field of Classification Search
CPC ................................. H04B 10/0795
USPC .......................................... 398/25
See application file for complete search history.

(56) References Cited

U.S. PATENT DOCUMENTS 9,825,698 B2 11/2017 Heismann
10,211,917 B1 2/2019 Wang et al.
10,218,436 B2 2/2019 Heismann
2020/0112367 A1* 4/2020 Huang .............. H04B 10/07953
2020/0412448 A1* 12/2020 Flettner .............. H04B 10/2543
2021/0273722 A1* 9/2021 He ..................... H04B 10/0731

FOREIGN PATENT DOCUMENTS

| CN | 104348544 A | 2/2015 |
|---|---|---|
| CN | 106817168 A | 6/2017 |
| CN | 108702208 A | 10/2018 |
| CN | 110048770 A | 7/2019 |
| CN | 111541483 A | 8/2020 |

(Continued)

OTHER PUBLICATIONS

International Search Report and Written Opinion issued in corresponding International application No. PCT/CN2022/123933 dated Dec. 15, 2022.

(Continued)

Primary Examiner — Mohammad R Sedighian
(74) Attorney, Agent, or Firm — BCF LLP

(57) ABSTRACT

The disclosed systems and methods for monitoring, by a coherent optical monitor (OPM), generalized optical signal-to-noise ratio (gOSNR) of an optical channel, the method comprising: i) receiving, by an input port of the coherent OPM, a first signal and a second signal, wherein: the first signal and the second signal include same data, the first signal is an optical signal received from the optical channel, and the first signal is affected by a noise; ii) processing, by a digital signal processor (DSP) of the coherent OPM, the first signal and the second signal and extract the data from the first signal and the second signal; iii) computing, by the DSP, a first correlation between the data from the first signal and the data from the second digital signal; and iv) computing, by the DSP, a first gOSNR based on the first correlation.

23 Claims, 12 Drawing Sheets

(56) References Cited

FOREIGN PATENT DOCUMENTS

WO WO 2020/036036 A1 * 2/2020 ........... H04B 10/077

OTHER PUBLICATIONS

Wolfgang Moench, Dr. Eberhard Loecklin, "Measurement of Optical Signal-to-Noise-Ratio in Coherent Systems using Polarization Multiplexed Transmission," OFC 2017, Th2A.42.

Lutz Rapp, Florian Azendorf, and Wolfgang Moench, "Capturing Nonlinear Signal Distortions by the Spectral Correlation Method," OFC 2021, F1B.5.

* cited by examiner

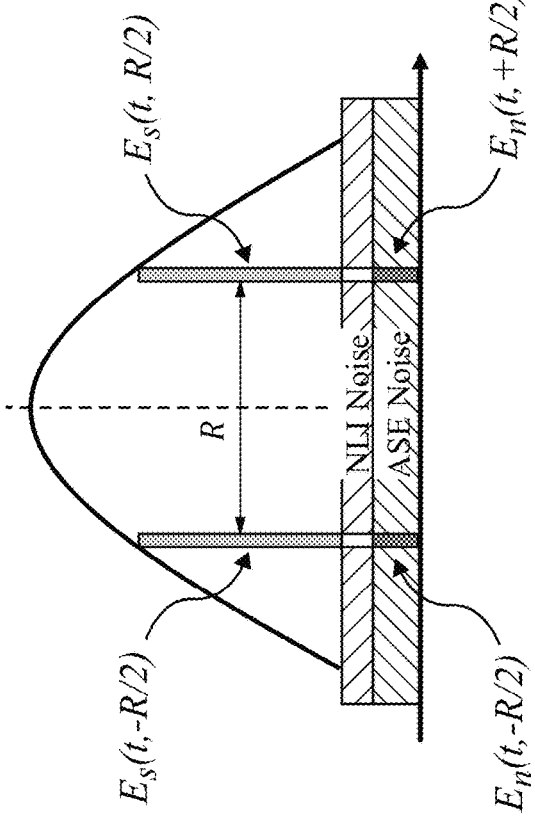
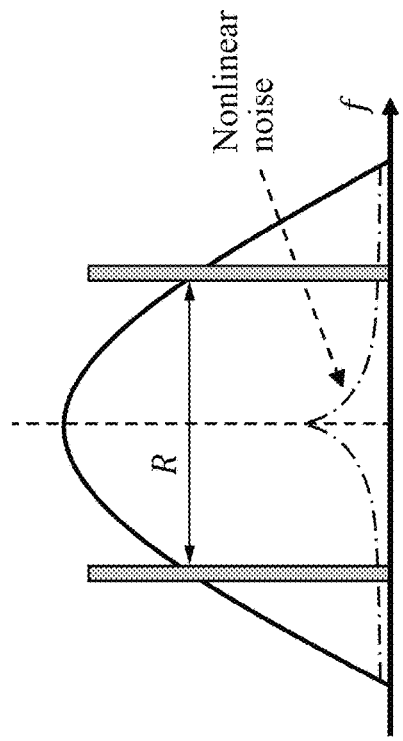
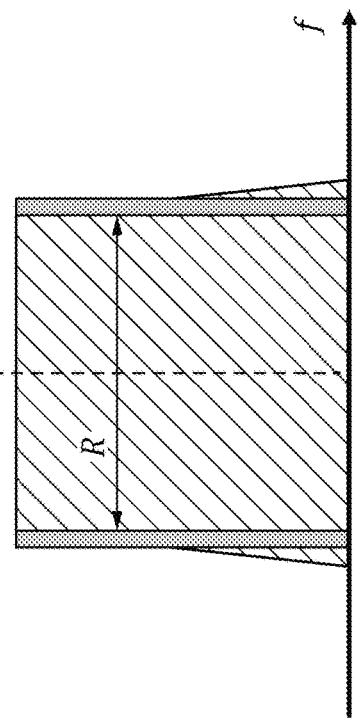
FIG. 3A (Prior Art)
FIG. 3B (Prior Art)
FIG. 3C (Prior Art)

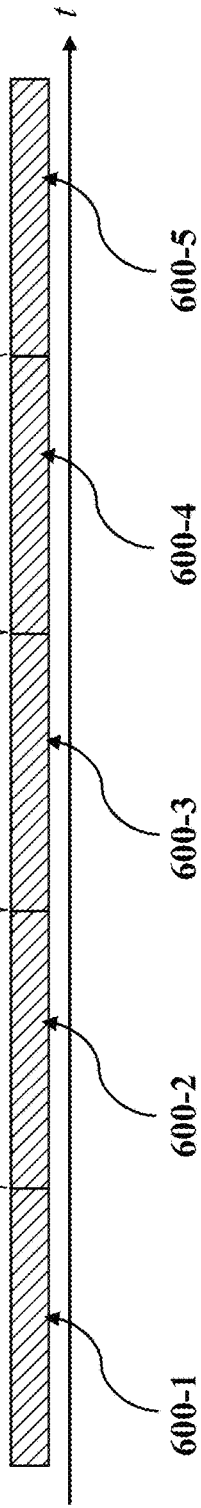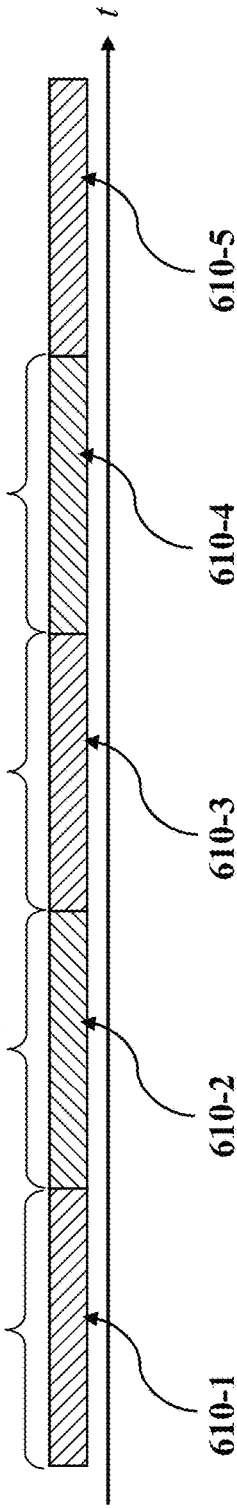
FIG. 6A
FIG. 6B

SYSTEMS AND METHODS FOR MONITORING GENERALIZED OPTICAL SIGNAL-TO-NOISE RATIO

CROSS-REFERENCE TO RELATED APPLICATIONS

This is the first application filed for the instantly disclosed technology.

TECHNICAL FIELD

The present disclosure generally relates to optical communications and, in particular, to a system and a method for monitoring generalized optical signal-to-noise ratio (gOSNR).

BACKGROUND

A typical dense wavelength division multiplexing (DWDM) transmission link consists of a number of fiber spans with typical maximum number of channels about 80 to 120 spaced by 50 GHz in the C band. Recently, the transmission links tend to be agile, disaggregated and open network that requires monitoring of the transmitted signal quality across the optical networks.

One of the major noise sources causing deterioration to the signal quality is the amplified spontaneous emission (ASE) generated at each amplifier along the transmission link. Optical signal-to-noise ratio (OSNR) has been accepted and used for a long time as a performance indicator that characterizes the ASE noise. However, the OSNR does not account the quality degradation due to the fiber nonlinear noises such as self-phase modulation (SPM) and cross-phase modulation (XPM) caused by Kerr-nonlinearity. Therefore, generalized OSNR (gOSNR) has been defined as a general quality indicator which accounts both ASE and nonlinear noises. Even so, the gOSNR and even the conventional OSNR are very difficult to measure in modern DWDM systems that aim for maximum spectral efficiency.

To this end, there is an interest in developing an efficient system, apparatus and method for monitoring gOSNR to characterize ASE and fiber nonlinear noise in the transmission link.

SUMMARY

The embodiments of the present disclosure have been developed based on developers' appreciation of the limitations associated with the prior art, namely a requirement of at least two optical performance monitors at a particular monitoring location to monitor generalized optical signal to noise ratio (gOSNR).

Developers of the present technology have devised systems and methods for monitoring the gOSNR. In order to monitor gOSNR, various non-limiting embodiments of the present disclosure may be directed towards computing correlation between repeated optical signals. Optical transmission quality indicator such as gOSNR may be obtained by correlation of two optical signal waveforms which have identical data signal but uncorrelated noises. Such optical signals may be achieved by sending repeated optical signals blocks from the Tx, or by sending band-pass filtered optical signals from the Tx, to a monitoring location. Alternatively, such optical signals may be achieved by sending captured optical signals from one monitoring location to another monitoring location. The correlation may use same spectral conditions and as such one coherent OPM may be used for the monitoring gOSNR. In addition to that, various non-limiting embodiments of the present disclosure may allow to monitor the gOSNR profile for entire optical signal spectrum as the techniques of the present disclosure may not be limited by spectral location or spectral width of the optical signals for correlation.

The techniques of the present disclosure may rely on one coherent OPM at a given monitoring location as compared to conventional techniques, which require two coherent OPMs at the given monitoring location, thus being cost effective. In addition, the techniques of the present disclosure are not limited to any specific frequency or frequency spacing, as the techniques may monitor whole spectral range. Therefore, the techniques may not be limited to the edge of the Nyquist signals and have capability to monitor the noise profile for non-flat signal or noises.

In accordance with a first broad aspect of the present disclosure, there is provided coherent optical performance monitor (OPM) for monitoring generalized optical signal-to-noise ratio (gOSNR) of an optical channel, the coherent OPM comprising: an input port configured to receive a first signal and a second signal, wherein: the first signal and the second signal include same data, the first signal is an optical signal received from the optical channel, and the first signal is affected by a noise; a digital signal processor configured to: process the first signal and the second signal and extract the data from the first signal and the second signal; compute a first correlation between the data from the first signal and the data from the second digital signal; and compute a first gOSNR based on the first correlation In accordance with any embodiments of the present disclosure, the first signal and the second signal are received from the optical channel.

In accordance with any embodiments of the present disclosure, the first signal and the second signal are generated by a coherent transmitter operated in an offline mode.

In accordance with any embodiments of the present disclosure, the input port is further configured to receive a third signal, the third signal including the same data as that included in the first signal and the second signal, the third signal further includes a predefined chromatic dispersion (CD).

In accordance with any embodiments of the present disclosure, the processor is further configured to: remove the predefined CD from the third signal; extract the data from the third signal; compute a second correlation between the data from the first signal and the data from the third signal; compute a second gOSNR based on the second correlation; and compute a self-phase noise based on a difference between the first gOSNR and the second gOSNR.

In accordance with any embodiments of the present disclosure, the first signal and the second signal are generated by a coherent transmitter operated in an online mode.

In accordance with any embodiments of the present disclosure, the second signal is received from a coherent transmitter via a communication channel distinct from the optical channel.

In accordance with any embodiments of the present disclosure, the second signal is synchronised to the first signal.

In accordance with any embodiments of the present disclosure, the second signal is received from a second coherent OPM via a communication channel distinct from the optical channel.

In accordance with any embodiments of the present disclosure, the second signal is a digital signal.

In accordance with any embodiments of the present disclosure, the coherent OPM is located downstream from the second coherent OPM.

In accordance with any embodiments of the present disclosure, operational characteristics of the second signal including a timing, a data length, a spectrum position, a dispersion, and a passband response of the second signal are aligned to operational characteristics of the first signal.

In accordance with a second broad aspect of the present disclosure, there is provided method for monitoring, by a coherent optical monitor (OPM), generalized optical signal-to-noise ratio (gOSNR) of an optical channel, the method comprising: receiving, by an input port of the coherent OPM, a first signal and a second signal, wherein: the first signal and the second signal include same data, the first signal is an optical signal received from the optical channel, and the first signal is affected by a noise; processing, by a digital signal processor (DSP) of the coherent OPM, the first signal and the second signal and extract the data from the first signal and the second signal; computing, by the DSP, a first correlation between the data from the first signal and the data from the second digital signal; and computing, by the DSP, a first gOSNR based on the first correlation.

In accordance with any embodiments of the present disclosure, the first signal and the second signal are received from the optical channel.

In accordance with any embodiments of the present disclosure, the first signal and the second signal are generated by a coherent transmitter operated in an offline mode.

In accordance with any embodiments of the present disclosure further comprise receiving, by the input port, a third signal, the third signal including the same data as that included in the first signal and the second signal, the third signal further includes a predefined chromatic dispersion (CD).

In accordance with any embodiments of the present disclosure, further comprises: removing, by the DSP, the predefined CD from the third signal; extracting, by the DSP, the data from the third signal; computing, by the DSP, a second correlation between the data from the first signal and the data from the third signal; computing, by the DSP, a second gOSNR based on the second correlation; and computing, by the DSP, a self-phase noise based on a difference between the first gOSNR and the second gOSNR.

In accordance with any embodiments of the present disclosure, the first signal and the second signal are generated by a coherent transmitter operated in an online mode.

In accordance with any embodiments of the present disclosure, the second signal is received from a coherent transmitter via a communication channel distinct from the optical channel.

In accordance with any embodiments of the present disclosure, the second signal is synchronised to the first signal.

In accordance with any embodiments of the present disclosure, the second signal is received from a second coherent OPM via a communication channel distinct from the optical channel.

In accordance with any embodiments of the present disclosure, the second signal is a digital signal.

In accordance with other embodiments of the present disclosure, operational characteristics of the second signal including a timing, a data length, a spectrum position, a dispersion, and a passband response of the second signal are aligned to operational characteristics of the first signal.

BRIEF DESCRIPTION OF THE FIGURES

Further features and advantages of the present disclosure will become apparent from the following detailed description, taken in combination with the appended drawings, in which:

FIG. 3A (Prior Art) illustrates a schematic diagram of a spectrum of an optical signal;

FIG. 3B (Prior Art) illustrates a schematic diagram of filtering of the spectrum of the optical signal at the edge of Nyquist signal;

FIG. 3C (Prior Art) illustrates a schematic diagram of non-linear noise spectrum in the spectrum of the optical signal;

FIG. 6A illustrates an example of repeated signals block generated by a transmitter, in accordance with various non-limiting embodiments of the present disclosure;

FIG. 6B illustrates another example of the repeated signals block generated by the transmitter, in accordance with various non-limiting embodiments of the present disclosure;

Figure 1:
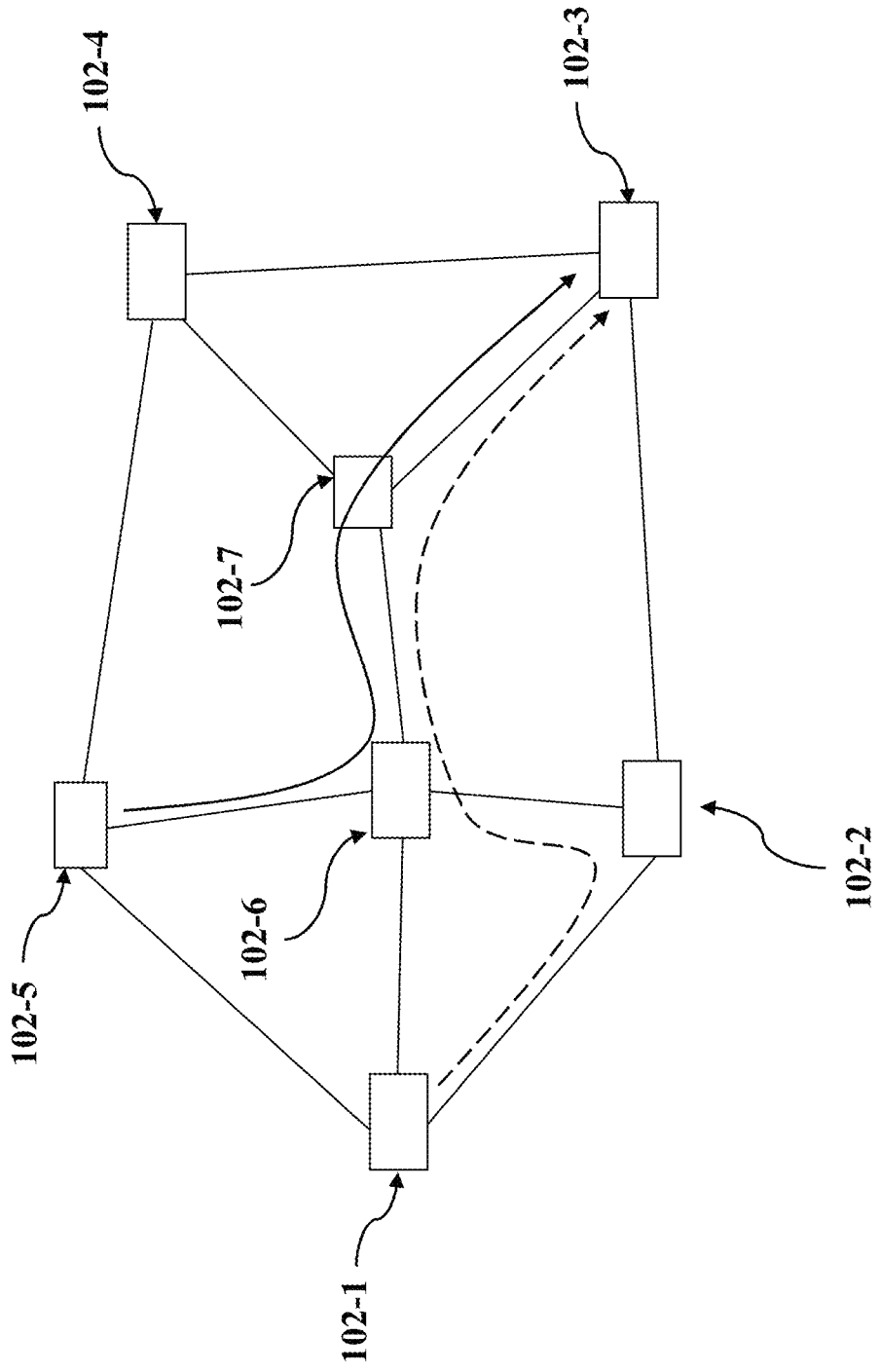
FIG. 1 (Prior Art) depicts a block diagram of a dense wavelength division multiplex (DWDM) optical transmission and switching system based optical network.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for monitoring generalized optical signal-to-noise ratio (gOSNR).

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in alike fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the conventional technology. In particular, the instant disclosure describes a system and a method for monitoring generalized optical signal-to-noise ratio (gOSNR).

Referring now to the drawings, FIG. 1 (Prior Art) depicts a block diagram of a dense wavelength division multiplex (DWDM) optical transmission and switching system based optical network 100. Optical network 100 typically has a plurality of reconfigurable optical add-drop multiplexer (ROADM) based nodes 1024, 102-2 . . . 102-7. Each node (e.g., 102-1, 102-2 . . . 102-7) may include optical multiplexing sections (OMSs) comprising optical add-drop multiplexers such as, for example, reconfigurable optical add-drop multiplexers (ROADMs) each containing at least one wavelength selective switch (WSS), multiplexers and demultiplexers or the like. Each node (e.g., 102-1, 102-2 . . . 102-7) may be configured to add, remove, and/or reroute an optical signal a given wavelength. Each OMS based node may further comprise multiple optical transport sections (OTSs), where at each OTS wavelengths remain the same.

Further, each node (e.g., 102-1, 102-2 . . . 102-7) in the optical network 100 may incorporate multiple optical amplifiers, e.g., erbium-doped fiber amplifiers (EDFAs), for amplifying the optical signals. The optical network 100 may further employ one or more optical network elements and modules (which may include either or both of active and passive elements/modules), such as, for example, optical filters, WSSs, arrayed waveguide gratings, optical transmitters, optical receivers, processors and other suitable components. However, for purposes of simplicity and tractability, these elements have been omitted from FIG. 1.

It is contemplated that nodes in the optical network may be communicatively connected by virtue of links including a plurality of optical fibers. The optical fiber may be of any suitable type such as, for example, standard single mode fibers (SSMFs), large effective area fibers (LEAFs) or the like. The links also include a plurality of optical amplifiers, such as, for example, EDFAs.

The optical network equipment, as referred to herein, comprises one or more passive and/or active optical network components and/or modules of the optical network 100, including, but not limited to, optical fiber, optical amplifiers, optical filters, optical links, WSSs, arrayed waveguide gratings, and laser light sources.

Figure 2A:
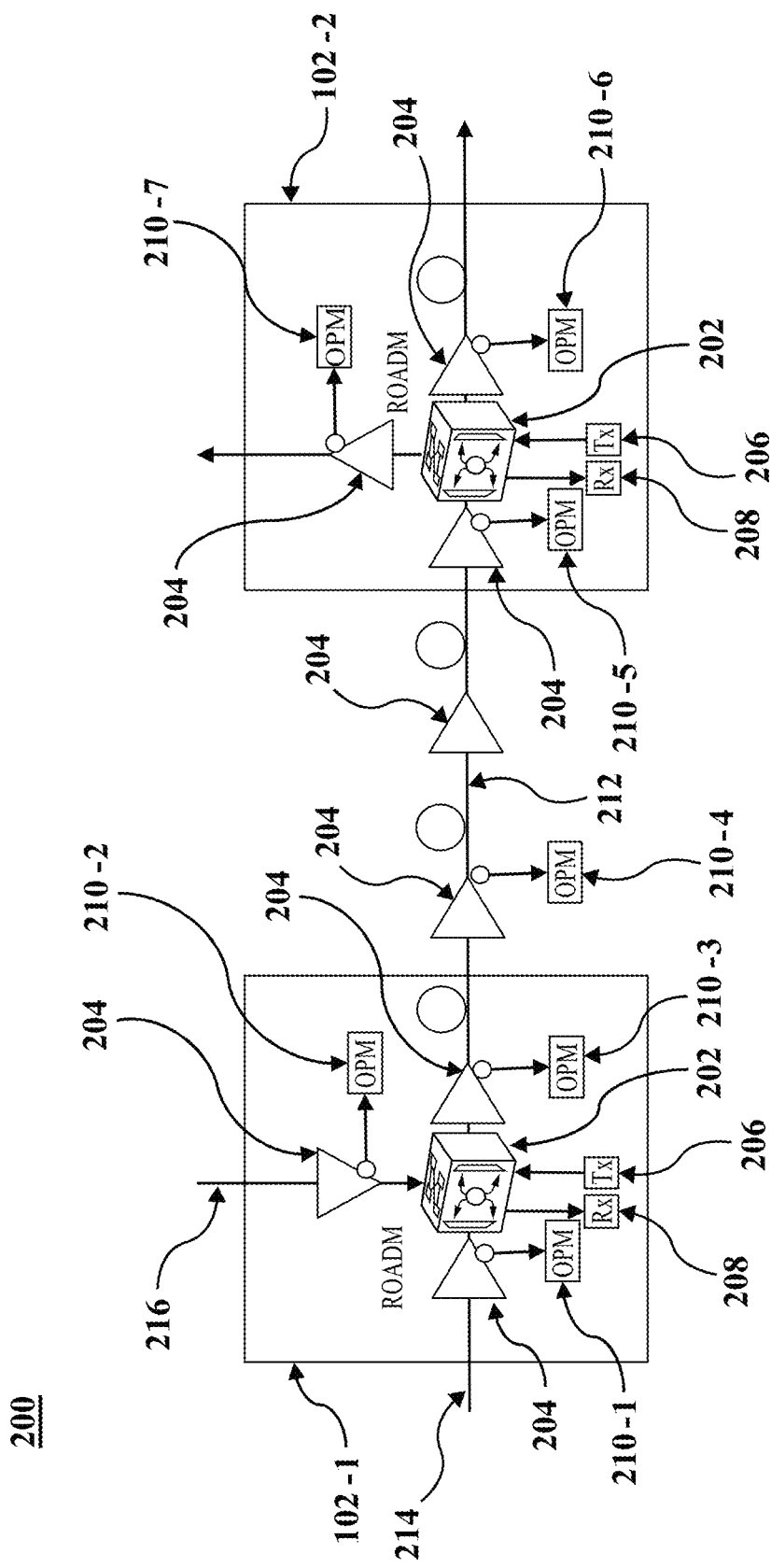
FIG. 2A (Prior Art) illustrates more details of a link between two reconfigurable optical add-drop multiplexers (ROADMs) based nodes of the optical network.

FIG. 2A (Prior Art) illustrates more details of a link 200 between the two nodes 102-1 and 102-2 of the optical network 100. The nodes 102-1 and 102-2 may include ROADMs 202, optical amplifiers 204, coherent transmitters 206, coherent receivers 208, and conventional coherent optical performance monitor (OPM) modules 210-1, 210-2, 210-3, 210-4, 210-5, 210-6, and 210-7 among other components (not illustrated). The distance between the two nodes 102-1 and 102-2 may be of the order of several tens to hundreds of kilometers. To monitor the optical signals at various monitoring locations between the two nodes 102-1 and 102-2, the link 200 may have multiple conventional coherent OPM modules 210-1, 210-2, 210-4, 210-5, 210-6, 210-7, and 210-8. The two nodes 102-1 and 102-2 may be connected by one or more optical fiber spans 212. The node 102-1 may be connected to one or more fiber links 214, 216, that may include DWDM signals, drop one or more optical channels from the fiber links 214, 216 at a receiver 208, add one or more optical channels generated by the coherent transmitter 206, and pass through other optical channels. The signals may be added or dropped using a WSS or a combination of WSS and other multiplexers and demultiplexers components (not shown). In some cases, dropped optical channels are converted from optical to electrical domain, and added channels are converted from electrical to optical domain. Otherwise, optical channels are switched or passed through in the optical domain.

For performance optimization and other operation/maintenance purposes, various optical networks (e.g., optical network 100) rely on monitoring various performance parameters. One such performance parameter is generalized optical signal-to-noise ratio (gOSNR). The gOSNR includes amplified spontaneous emission (ASE) as well as fiber nonlinear noises caused by Kerr-nonlinearity such as self-phase modulation (SPM) induced by the signal channel itself and cross-phase modulation (XPM) induced by all other optical channels except the signal channel. Therefore, generalized OSNR (gOSNR) may be defined as a general quality indicator which accounts both ASE and nonlinear noises.

Figure 2B:
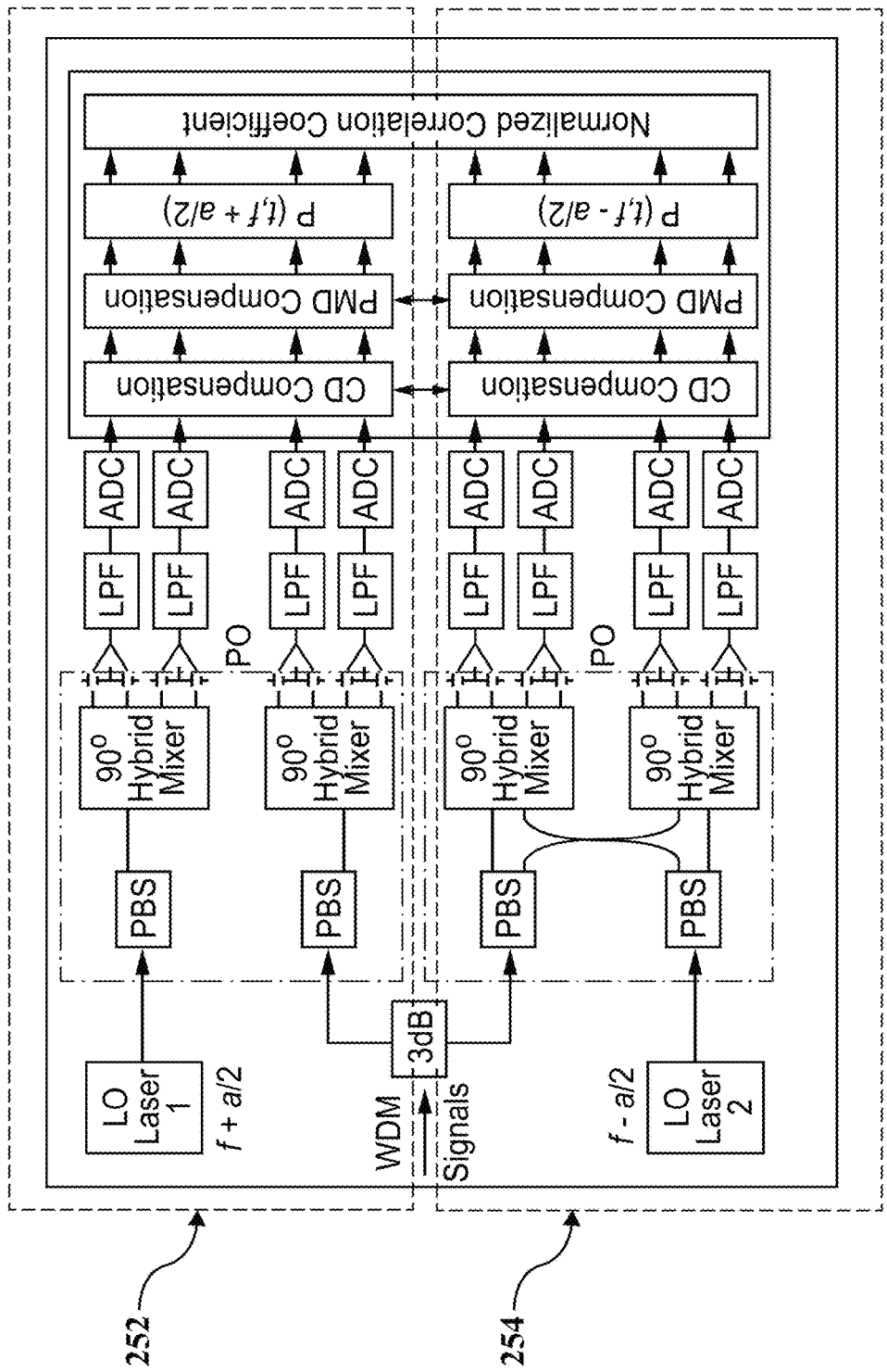
FIG. 2B (Prior Art) illustrates a conventional coherent OPM module.

Various conventional techniques rely on spectral correlation technique which utilizes the cyclic property of the spectrum of the optical signals. In particular, each conventional coherent OPM modules 210-1, 210-2, 210-3, 210-4, 210-5, 210-6, and 210-7 is configured to compute spectral correlation of the electric field obtained by converting the optical signal into corresponding electrical signal at two frequencies separated by a baud rate of the optical signal. FIG. 2B (Prior Art) illustrates a conventional coherent OPM module 210-1. As shown, the conventional coherent OPM module 210-1 includes two OPMs 252 and 254. Each of the two OPMs 252 and 254 include a separate local oscillator (LO) and other hardware components such as polarization beam splitters, mixers, low pass filters, analog-to-digital converters (ADCs) or the like.

FIG. 3A (Prior Art) illustrates a schematic diagram of the spectrum 300 of the optical signal. In the spectrum 300, R is the baud rate, $E_s(t,f)$ and $E_n(t,f)$ are the electric field of signal and noise at frequency f, respectively. The two signal samples $E_s(t,-R/2)$ and $E_s(t,R/2)$ are separated by R and are 100% correlated while the two noise samples $E_n(t,-R/2)$ and $E_n(t,R/2)$ are completely uncorrelated. Consequently, the correlation of total electric field at each frequency results SNR as below:

$$\frac{\langle (E_s(t)+E_n(t,-R/2))(E_s(t)+E_n(t,R/2))^* \rangle}{\sqrt{\langle |E_s(t)+E_n(t,-R/2)|^2 \rangle \langle |E_s(t)+E_n(t,R/2)|^2 \rangle}} =$$

$$\frac{\langle |E_s(t)|^2 \rangle}{\sqrt{(\langle |E_s(t)|^2 \rangle + \langle |E_n(t,-R/2)|^2 \rangle)(\langle |E_s(t)|^2 \rangle + \langle |E_n(t,R/2)|^2 \rangle)}} =$$

$$\frac{P_s}{P_s + P_n} = \frac{1}{1+1/SNR}$$

where, $P_s = \langle |E_s(t)|^2 \rangle$ is the signal power, $P_n = \langle |E_n(t,-R/2)|^2 \rangle = \langle |E_n(t,R/2)|^2 \rangle$ is the noise power, and $SNR = P_s/P_n$ is the signal-to-noise ratio. The resulted SNR can be directly converted to gOSNR. It is to be noted that for simplicity, $E_s(t)$ is used, instead of $E_s(t,-R/2)$ and $E_s(t,R/2)$.

However, there are a few concerns with the conventional techniques. Firstly, this method requires that a given conventional coherent OPM module (e.g., 210-2) at each monitoring location include at least two coherent OPMs having two LOs and the additional hardware to process $E(t,-R/2)$ and E(t,R/2) at two different frequencies of the optical signal. The coherent OPMs are expensive components, therefore, it is cost inefficient to use two coherent OPMs including at least two LOs and the additional hardware, if used for the sole purpose of evaluating gOSNR. Also, the laser frequency separation between two coherent OPMs requires high accuracy to the baud rate.

Secondly, the gOSNR can only be monitored at half baud rate frequency. This can be an issue with strong filtering of the spectrum 310 of the optical signal at the very edge of Nyquist signal as shown in FIG. 3B (Prior Art).

Lastly, the non-linear noise spectrum 320 is not flat as shown in FIG. 3C (Prior Art) which varies for different transmission link configurations and channel loadings. Since the conventional techniques require frequency spacing close to the baud rate, the conventional techniques can only monitor the edge of the spectrum which may not be the true non-linear noise. Similar issues can be existing for non-flat shaped signals and non-flat ASE noises.

With this said, various non-limiting embodiments of the present disclosure, are directed towards a system and a method for monitoring the gOSNR. In order to monitor gOSNR, various non-limiting embodiments of the present disclosure may be directed towards computing correlation between repeated optical signals. Optical transmission quality indicator such as gOSNR may be obtained by correlation of two optical signal waveforms which have identical data signal but uncorrelated noises. Such optical signals may be achieved by sending repeated optical signals blocks from the Tx, or by sending band-pass filtered optical signals from the Tx, to a monitoring location. Alternatively, such optical signals may be achieved by sending captured optical signals from one monitoring location to another monitoring location. The correlation may use same spectral conditions and as such one coherent OPM may be used for the monitoring gOSNR. In addition to that, various non-limiting embodiments of the present disclosure may allow to monitor the gOSNR profile for entire optical signal spectrum as the techniques of the present disclosure may not be limited by spectral location or spectral width of the optical signals for correlation.

The techniques of the present disclosure may rely on one coherent OPM at a given monitoring location as compared to conventional techniques, which require two coherent OPMs at the given monitoring location, thus being cost effective. In addition, the techniques of the present disclosure are not limited to any specific frequency or frequency spacing, as the techniques may monitor whole spectral range. Therefore, the techniques may not be limited to the edge of the Nyquist signals and have capability to monitor the noise profile for non-flat signal or noises.

Figure 4:
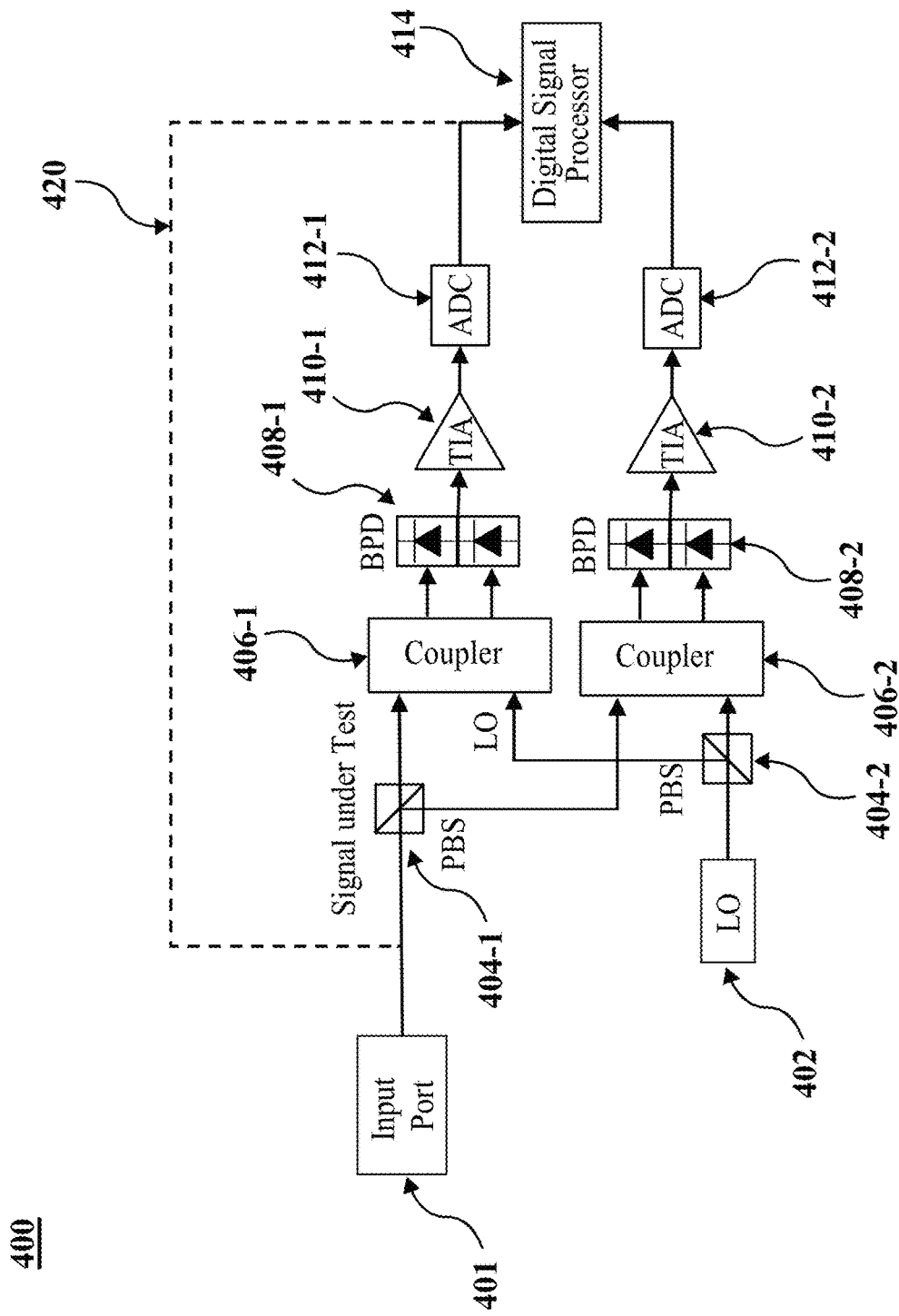
FIG. 4 illustrates a coherent OPM for monitoring the gOSNR of an optical channel, in accordance with various non-limiting embodiments of the present disclosure.

In particular, FIG. 4 illustrates a coherent OPM 400 for monitoring the gOSNR of an optical channel, in accordance with various non-limiting embodiments of the present disclosure. As shown, the coherent OPM 400 may include an input port 401, a local oscillator (LO) 402, polarization beam splitters (PBS) 404-1 and 404-2, couplers 406-1 and 406-2, balanced photodetectors (BPDs) 408-1 and 408-2, transimpedance amplifiers (TIAs) 410-1 and 410-2, ADCs 412-1 and 412-2, and DSP 414. It is to be noted that the coherent OPM 400 may include additional components, however, such components have been omitted from FIG. 4 for the purpose of simplicity.

It is to be noted that the illustrated coherent OPM 400 may operate on the optical signals having a dual polarization. However, in various non-limiting embodiments, the coherent OPM 400 may operate on the optical signals having single polarizations without limiting the scope of the present disclosure. It is assumed that the optical signals may have a dual polarization, however, the optical signals may have any orientation and the coherent OPM 400 may have the components accordingly.

In the coherent OPM 400, the input port 401 receives the optical signals whose performance is to be monitored.

In certain embodiments, the optical signals may be divided into two sets of orthogonal polarized optical channel signals by the PBS 404-1. The first set of orthogonal polarized optical signals may be forwarded to the coupler 406-1 and the second set of orthogonal polarized optical signals may be forwarded to the coupler 406-2.

The LO 402 may generate LO signal and may forward the LO signal to the PBS 404-2 for generating two orthogonal polarized LO signals. The first orthogonal polarized LO signal may be forwarded to the coupler 406-1 and the second orthogonal polarized LO signal may be forwarded to the coupler 406-2.

The couplers 406-1 and 406-2 may combine the orthogonal polarized optical signals with the orthogonal polarized LO signals to generate combined optical signals. The combined optical signals may represent the spectral components extracted from the orthogonal polarized optical channel signals located at the frequency of the orthogonal polarized LO signals. The BPD 408-1 and 408-2 may convert the output of couplers 406-1 and 406-2 (i.e., the combined optical signals) into electrical signals.

The BPDs 408-1 and 408-2 may transmit the electrical signals to TIAs 410-1 and 410-2. The TIAs 410-1 and 410-2 may amplify the electrical signals, apply low pass filtering and forward the amplified electrical signals to the ADC 412-1 and 412-2. In certain embodiments, the TIAs 410-1 and 410-2 may be followed by additional electrical amplifiers omitted in FIG. 4 for the purpose of simplicity. The ADC 412-1 and 412-2 may convert the amplified electrical signals to digital signals and forward the digital signals to the DSP 414. The DSP 414 may process the digital signals, compute the correlation between digital signals and compute the gOSNR.

Figure 5:
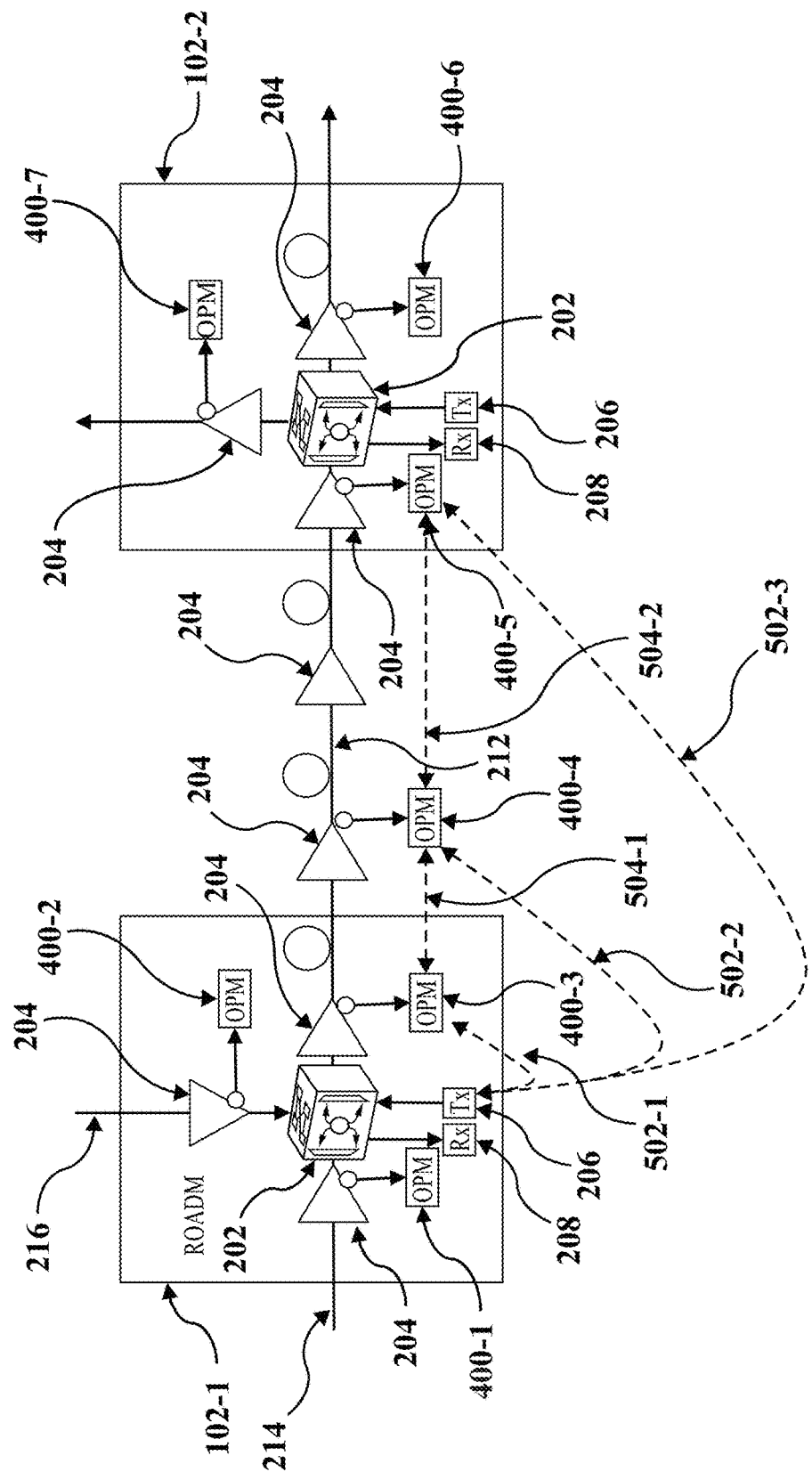
FIG. 5 illustrates a link as introduced in FIG. 2A, updated in accordance with various non-limiting embodiments of the present disclosure.

FIG. 5 illustrates an updated link 500 between two nodes of the optical network 100, in accordance with various non-limiting embodiments of the present disclosure. The updated link 500 may be similar to the link 200 (as shown in FIG. 2A) except for the fact that the conventional coherent OPM module 210-1, 210-2, 210-3, 210-4, 210-5, 210-6, and 210-7 have been replaced with coherent OPMs 400-1, 400-2, 400-3, 400-4, 400-5, 400-6, and 400-7. It is to be noted that the coherent OPMs 400-1, 400-2, 400-3, 400-4, 400-5, 400-6, and 400-7 may be implemented in a similar manner to the coherent OPM 400 (as previously discussed in FIG. 4) and may include similar components. Hereinafter, the components of the coherent OPM 400 may be referred with respect to the components the coherent OPMs 400-1, 400-2, 400-3, 400-4, 400-5, 400-6, and 400-7.

In addition, the updated link 500 may include first communication channels 502-1, 502-2, and 502-3 between the coherent transmitter 206 and the coherent OPMs 400-3, 400-4 and 400-5 and a second communication channels 504-1 and 504-2 between different coherent OPMs 400-3, 400-4, and 400-5. Remaining component of the updated link 500 may be similar to the components discussed with respect to the link 200. It to be noted that as shown, the first communication channels 502-1, 502-2 and 502-3 and the second communication channels 504-1 and 504-2 may be distinct from the optical fiber spans 212.

In one non-limiting embodiment, the gOSNR may be monitored at a location where the coherent OPM 400-4 may be located. This may allow to measure the gOSNR between the node 102-1 and the optical amplifier 204 collocated with the coherent OPM 400-4. The coherent OPM 400-4 may include the input port 401. The input port 401 may receive a first signal, a second signal and a third signal. The first signal, the second signal and the third signal may include the same data. Also, the third signal may include a predefined chromatic dispersion (CD). The first signal may be an optical signal received from the optical channel. The optical channel may be referred to as a path between two nodes (for e.g., the nodes 102-1 and 102-2) including the optical fiber spans 212 and the optical amplifiers 204.

The second signal and the third signal may be optical or electrical signals. The second signal may be received from the optical channel or some other communication channel. The third signal may be received from some other communication channel.

In case, the first signal, the second signal, and the third signal are optical signals, the coherent OPM 400-4 may process the first signal, the second signal and the third signal to convert them into corresponding digital signals. In case, the second signal and/or the third signal are electrical signals, the input port 401 may forward the received second signal and/or the third signal to the DSP 414 for further processing. It is to be noted that prior to forwarding the received electrical signals, the electrical signals may be converted to digital signals by an analog-to-digital converter (e.g., 412-1, 412-2).

The DSP 414 may process the digital signals from the first signal, the second signal and the third signal to extract the data from the electrical signals. In order to process the third signal, the DSP 414 may remove the included predefined CD.

The DSP 414 may compute a first correlation between the data from the first signal and the second signal. Based on the first correlation, the DSP 414 may compute a first gOSNR. The DSP 414 may also compute a second correlation between the data from the first signal and the third signal. Based on the second correlation, the DSP 414 may compute a second gOSNR. The DSP 414 may compute a self-phase noise based on a difference between the first gOSNR and the second gOSNR.

In certain non-limiting embodiments, the coherent OPM 400-4 may monitor the gOSNR in offline mode and online mode. In offline mode the coherent transmitter 206 may not be transmitting real-time data signals and in the online mode, the transmitter 206 may be transmitting the real-time data signals.

In certain non-limiting embodiments, the coherent transmitter 206 may operate in offline mode. During offline mode of transmission, the coherent transmitter 206 may generate repeated signals and transmit the repeated signals towards the node 102-2 via the optical fiber spans 212. Based on the repeated signals, the coherent OPM 400-4 may compute the gOSNRs.

FIG. 6A illustrates an example of repeated signals block 600 generated by the coherent transmitter 206 while being operated in offline mode, in accordance with various non-limiting embodiments of the present disclosure. As shown, the repeated signals block 600 may include repeated signals 600-1, 600-2, 600-3, 600-4, and 600-5. The repeated signals 600-1, 600-2, . . . 600-5 may include identical signal patterns. In other words, each of the repeated signals 600-1, 600-2, . . . 600-5 may include the same data.

The coherent OPM 400-4 may monitor the gOSNR along the optical fibre spans 212 at various monitoring locations. The coherent OPM 400-4 may receive the repeated signals 600-1, 600-2, . . . 600-5. It is to be noted that the received repeated signals 600-1, 600-2, . . . 600-5 may be identical signals having same power $P_s(t)$ or electric field MO but uncorrelated noises $E_{n,i-1,SPM}(t)$, $E_{n,i,SPM}(t)$, $E_{n,i+1,SPM}(t)$ etc. The uncorrelated noises may include ASE, XPM, and transmitter noises. The coherent OPM 400-4 may consider at least two repeated signals (e.g., 600-2 and 600-3) to compute gOSNR by computing a correlation between the at least two repeated signals (e.g., 600-2 and 600-3). In particular, the coherent OPM 400-4 may convert the at least two repeated signals (e.g., 600-2 and 600-3) into digital signals and the DSP 414 (as shown in FIG. 4) may compute the gOSNR by computing the correlation between the digital signals.

In certain non-limiting embodiments, the correlation may be computed based on electric fields of the two repeated signals (e.g., 600-2 and 600-3) and is given by:

$$Ecorr_I = \frac{\langle E_i(t) E_{i+2}(t)^* \rangle}{\sqrt{\langle |E_i(t)|^2 \rangle \langle |E_{i+1}(t)|^2 \rangle}} =$$

$$\frac{\langle |E_s(t)|^2 \rangle + \langle |E_{n,i,SPM}(t)|^2 \rangle}{\sqrt{(\langle |E_s(t)|^2 \rangle + \langle |E_{n,i}(t)|^2 \rangle)(\langle |E_s(t)|^2 \rangle + \langle |E_{n,i+2}(t)|^2 \rangle)}} =$$

$$\frac{P_s + P_{n,SPM}}{P_s + P_n} = \frac{P_s + P_{n,SPM}}{(P_s + P_{n,SPM}) + (P_n - P_{n,SPM})} \cong \frac{1}{1 + 1/SNR_I}$$

where $E_i(t)$ is the total electric field of i-th signal, $E_s(t)$ is the electric field of signal part in each signal, $E_{n,i}(t)$ is the electric field of total noise of i-th signal, $E_{n,i,SPM}$ is the electric field of SPM noise of the i-th signal, $P_s = \langle |E(t)|^2 \rangle$ is the power of the signal part in each signal, of each block, $P_n = \langle |E_{n,i}(t)|^2 \rangle = \langle |E_{n,i+1}(t)|^2 \rangle$ is the power of noise of signal, $P_{n,SPM}$ is the power SPM noise of the i-th signal, and $SNR_I = P_s/(P_n - P_{n,SPM})$ is the signal to noise ratio due to signals with same CD.

In certain non-limiting embodiments, the correlation may be computed based on power of the two repeated signals (e.g., 600-2 and 600-3) and may be computed by:

$$K(1 - Pcorr_I) = \frac{0.5 P_n'^2 + 2 P_s' P_n'}{(P_s' + P_n')^2} = \frac{0.5 + 2SNR_I}{(SNR_I + 1)^2}$$

$$K = \frac{\sqrt{\langle |P_i(t)|^2 \rangle \langle |P_{i+1}(t)|^2 \rangle}}{\langle P_i(t) \rangle \langle P_{i+1}(t) \rangle} = \frac{\sqrt{\langle |P_i(t)|^2 \rangle \langle |P_{i+1}(t)|^2 \rangle}}{P_s^2 + 2 P_s P_n + P_n^2}$$

Where, k is dimensionless factor, and $P_i(t)$ is the total power of i-th signal, $P_s'$ and $P_n'$ are powers computed form $E_s(t)'$ and $E_{n,i}(t)'$ and $E_s(t)' = E_s(t) E_{n,i,SPM}(t)$ and $E_{n,i}(t)' = E_{n,i}(t) - E_{n,i,SPM}(t)$.

It is to be noted that the gOSNR computed from the received repeated signals 600-1, 600-2, . . . 600-5 may not disclose the effect of SPM noise, as the SPM noise may be identical with the repeated signals 600-1, 600-2, . . . 600-5.

To further improve an accuracy of the computed gOSNR, in certain non-limiting embodiments, the coherent transmitter 206 may add a large chromatic dispersion (CD) in alternative repeated signals (e.g., 600-1, 600-3, . . . 600-5). FIG. 6B illustrates an example of repeated signals block 610 generated by the coherent transmitter 206, in accordance with various non-limiting embodiments of the present disclosure. As shown, the repeated signal block 610 may include repeated signals 610-1, 610-2, 610-3, 610-4, and 610-5. Although, the repeated signals 610-1, 610-2, . . . 610-5 may include identical signal data, the coherent transmitter 206 may add CD to alternative repeated signals (e.g., 610-1, 610-3, 610-5 or the like).

The coherent OPM 400-4 may receive the repeated signals 610-1, 610-2, . . . 610-5. It is to be noted that each of the received repeated signals (e.g., 610-1, 610-3, and 610-5) to which the CD was added by the coherent transmitter 206, may have may have identical signals having same power $P_s(t,CD)$ but uncorrelated noises $E_{n,i+2}(t)$, $E_{n,i}(t)$, etc. Also, each of the received repeated signal (e.g., 610-2 and 610-4) to which no CD was added by the coherent transmitter 206 may have may have identical signals having same power $P_s(t)$ but uncorrelated noises $E_{n,i+1}(t)$, $E_{n,i-1}(t)$, etc. The uncorrelated noises in this case may include ASE, SPM, XPM, and transmitter noises. The coherent OPM 400-4 may consider at least two adjacent repeated signals (e.g., 610-2 and 610-3) to compute gOSNR. The coherent OPM 400-4 may compute a correlation between the at least two adjacent repeated signals (e.g., 610-2 and 610-3) and then may compute the gOSNR based on the correlation.

Figure 6C:
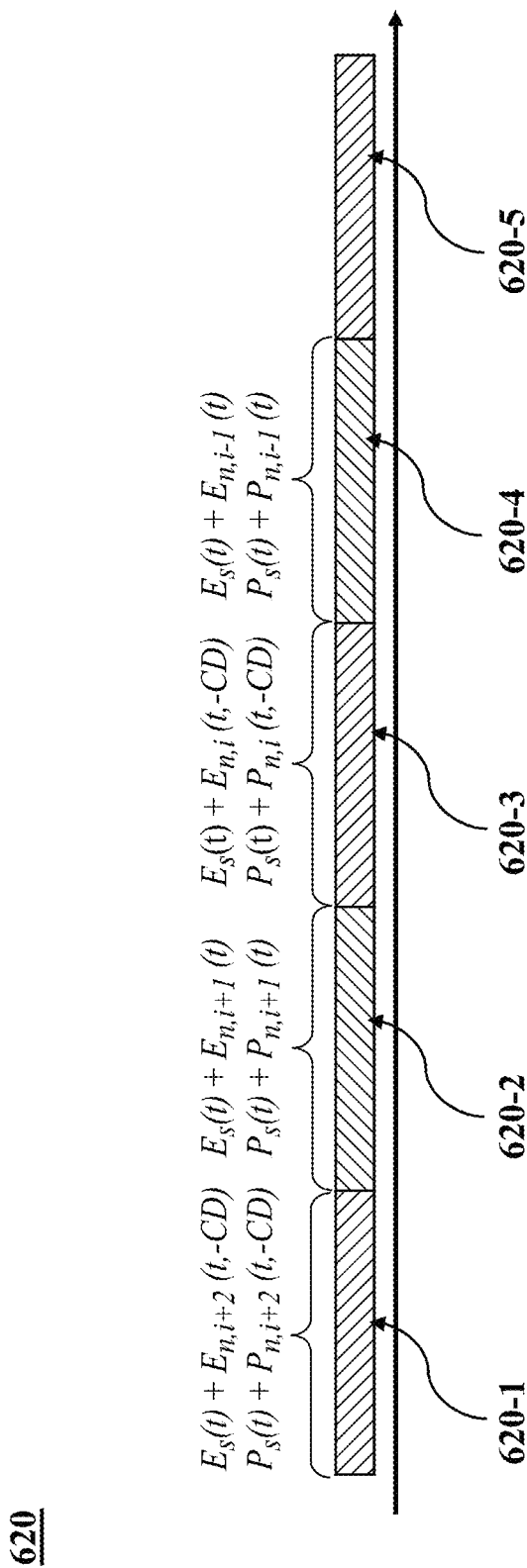
FIG. 6C illustrates an example of the repeated signals block of FIG. 6B processed by the coherent OPM, in accordance with various non-limiting embodiments of the present disclosure.

In certain non-limiting embodiments, the coherent OPM 400-4 may process the received repeated signals (e.g., 610-1, 610-3, and 610-5) to remove the CD. In so doing, although the signal pattern in each of the received repeated signals (e.g., 610-1, 610-2, . . . 610-5) may become the same, the SPM noise in this case remain uncorrelated. FIG. 6C illustrates an example of repeated signals block 620 processed by the coherent OPM 400-4, in accordance with various non-limiting embodiments of the present disclosure. As shown, the processed repeated signals block 620 may include processed repeated signals 620-1, 620-2, 620-3, 620-4, and 620-5. The processed repeated signals (e.g., 620-1 and 620-3) to which the CD was previously added by the coherent transmitter 206, may have identical signals having same power $P_s(t)$, however, the associated noises $E_{n,i+2}(t,-CD)$, $E_{n,i}(t,-CD)$ may have uncorrelated SPM noise due the CD.

Further, the coherent OPM 400-4 may convert the at least two adjacent processed repeated signals (e.g., 620-2 and 620-3) into digital signals and the DSP 414 (as shown in FIG. 4) may compute the gOSNR by computing the correlation between the digital signals. In this case, the gOSNR may also include the effect of SPM noise.

Since the gOSNR from identically repeated signals block 600 may not disclose the SPM noise but it is included in the gOSNR from repeated signals block 610 with added CD. In certain non-liming embodiments, the coherent OPM 400-4 may compute the effect SPM noise by taking a difference between gOSNR computed between two identical repeated signals (e.g., 620-2 and 620-4) and gOSNR computed between two adjacent processed repeated signals (e.g., 620-2 and 620-3).

In certain non-limiting embodiments, the correlation may be computed based on electric fields of the two repeated signals (e.g., 620-2 and 620-3) and is given by $$Ecorr_D = \frac{\langle E_i(t)E_{i+1}(t)^*\rangle}{\sqrt{\langle |E_i(t)|^2\rangle \langle |E_{i+1}(t)|^2\rangle}} = \frac{\langle (E_s(t)+E_{n,i}(t))(E_s(t)+E_{n,i+1}(t))^*\rangle}{\sqrt{\langle |E_s(t)+E_{n,i}(t)|^2\rangle \langle |E_s(t)+E_{n,i+1}(t)|^2\rangle}} =$$

$$\frac{\langle |E_s(t)|^2\rangle}{\sqrt{(\langle |E_s(t)|^2\rangle + \langle |E_{n,i}(t)|^2\rangle)(\langle |E_s(t)|^2\rangle + \langle |E_{n,i+1}(t)|^2\rangle)}} =$$

$$\frac{P_s}{P_s + P_n} = \frac{1}{1+1/SNR_D}$$

Where $SNR_D = P_s/P_n$ is the signal to noise ratio due to signals with different CD.

In certain non-limiting embodiments, the correlation may be computed based on power of the two repeated signals (e.g., 620-2 and 620-3) and may be computed by:

$$Pcorr_D = \frac{\langle P_i(t)P_{i+1}(t)\rangle}{\sqrt{\langle |P_i(t)|^2\rangle \langle |P_{i+1}(t)|^2\rangle}} = \frac{\langle P_s(t)^2\rangle + 2\langle P_s(t)\rangle\langle P_n(t)\rangle + \langle P_n(t)\rangle^2}{\langle P_s(t)^2\rangle + 4\langle P_s(t)\rangle\langle P_n(t)\rangle + \langle P_n(t)^2\rangle}$$

$$K(1 - Pcorr_D) = \frac{0.5P_n^2 + 2P_sP_n}{(P_s+P_n)^2} = \frac{0.5 + 2SNR_D}{(SNR_D+1)^2}$$

Unlike the conventional techniques that may require to tune the LOs to specific frequencies separated by a baud rate of the optical signal (as shown FIG. 3A), in various non-limiting embodiments of the present disclosure the LO 402 of the coherent OPM 400-4 may be tuned to any frequency in the spectrum of the repeated signals to monitor gOSNR at that frequency.

In addition, operating the coherent transmitter 206 in offline mode or, alternatively, according to the various techniques discussed further in the present disclosure, may assist the coherent OPM 400-4 to monitor the gOSNR even when the transmitter is operating in the online mode, i.e., the coherent transmitter 206 may be transmitting the real-time data signals over the optical fiber spans 212.

Returning to FIG. 5, in certain non-limiting embodiments, where the coherent transmitter 206 may be operated in online mode, the coherent transmitter 206 and the coherent OPM 400-4 may communicate with each other for example via the first communication channel 502-2 prior to monitoring the gOSNR. In order to monitor the gOSNR, the coherent transmitter 206 and the coherent OPM 400-4 may be synchronized and the LO 402 may be tuned to a desired frequency. In online mode, the coherent transmitter 206 may transmit real-time over the optical fiber spans 212. The coherent OPM 400-4 may receive at least a portion of the real-time data signals from the optical fiber spans 212. The coherent OPM 400 may process the received real-time data signal and store the processed real-time data signals.

The transmitter 206 may store the portion of the real-time data signals to be received by the coherent OPM 400-4 for further processing. The coherent transmitter 206 may generate an band-pass signal, having a time varying power defined as $P_s^{calc}(t)$, from the portion of the real-time data signals to be transmitted over the optical fiber spans 212. The band-pass signal and the portion of the real-time data signals may be synchronized. The coherent transmitter 206 may transmit the band-pass signal towards the coherent OPM 400-4 using the first communication channel 502-2. In certain non-limiting embodiments, the band-pass signal may be transmitted in digital domain using any suitable digital communication network (DCN) technique.

The first communication channel 502-2 may be based on any suitable wireline communication technique including copper, aluminium, optical or the like based wireline communication infrastructure. The band-pass signal received by the coherent OPM 400-4 may have a very little effect of the noise. The coherent OPM 400-4 may process the band-pass signal. Further, the coherent OPM 400-4 may convert the portion of the real-time data signals to the corresponding digital signals and compute the gOSNR based on correlation between the digital signals the and the band-pass signal. It is to be noted that the portion of the real-time data signals and the band-pass signal may include similar data.

In certain non-limiting embodiments, in order to generate the calculated band-pass signal having power from the portion of the real-time data signals to be transmitted over the optical fiber spans 212, the coherent transmitter 206 may perform various operations over the portion of the real-time data signals. It is to be noted that, since the real-time data signals may be captured at different locations, it may be desirable to align various operational characteristics including timing, data length, spectrum position, dispersion, and passband response of the band-pass signal with the operational characteristics of the portion of the real-time data signals to optimize the monitoring of the gOSNR. It is to be noted that the alignment may be referred to as matching, mapping, adjusting, arranging or the like.

Figure 7:
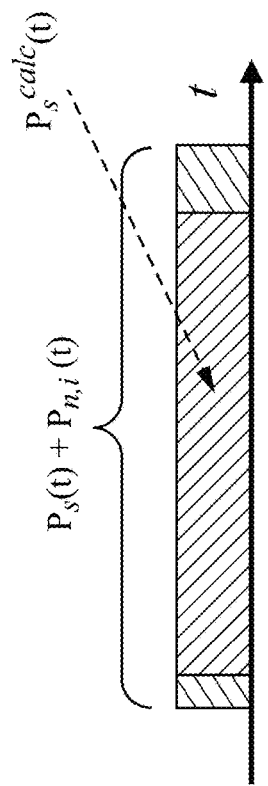
FIG. 7 illustrates an example of the power of the portion of the real-time data signal captured by the coherent OPM represented as $P_s(t)+P_{n,i}(t)$, in accordance with various non-limiting embodiments of the present disclosure.

These alignments may be done in many ways, for example the coherent OPM 400-4 may capture longer data at higher bandwidth to allow room for timing synchronization and spectrum alignment of the band-pass signal. FIG. 7 illustrates an example 700 of the power of the portion of the real-time data signal captured by the coherent OPM 400-4 represented as $P_s(t)+P_n(t)$, in accordance with various non-limiting embodiments of the present disclosure. As shown, the portion of the real-time data signal captured by the coherent OPM 400-4 having the power defined as $P_s(t)+P_n(t)$ is wider than the band-pass signal, having the power defined as $P_s^{calc}(t)$.

Figure 8:
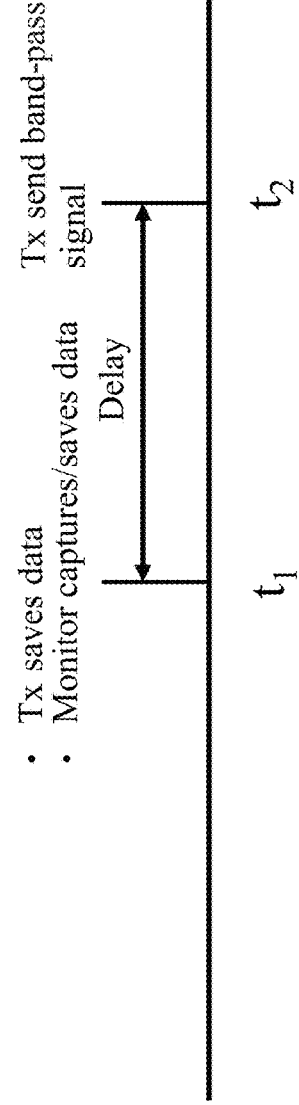
FIG. 8 illustrates a representative timeline of signal transmissions between the transmitter and the coherent OPM, in accordance with various non-limiting embodiments of the present disclosure.

In another non-limiting alignment technique, the coherent transmitter 206 may save the portion of the real-time data signals at the same time when the coherent OPM 400-4 receives the portion of the real-time data signals. FIG. 8 illustrates a representative timeline 800 of signal transmissions between the coherent transmitter 206 and the coherent OPM 400-4, in accordance with various non-limiting embodiments of the present disclosure. As shown, at time instant $t_1$, the transmitter 206 may save the portion of the real-time data signals and the coherent OPM 400-4 may receive the portion of the real-time data signals. After a delay at time $t_2$, the coherent transmitter 206 may transmit the band-pass signal towards the coherent OPM 400-4 using the first communication channel 502-2.

It is to be noted the coherent transmitter 206 may include a processor and memory elements. The memory elements may store instructions to be implemented on processor to perform various functionalities of the coherent transmitter 206. In addition to storing the instructions, the memory elements may store various data during performing various functionalities of the coherent transmitter 206. In certain non-limiting embodiments, the memory elements may be non-transitory memory device.

Figure 9:
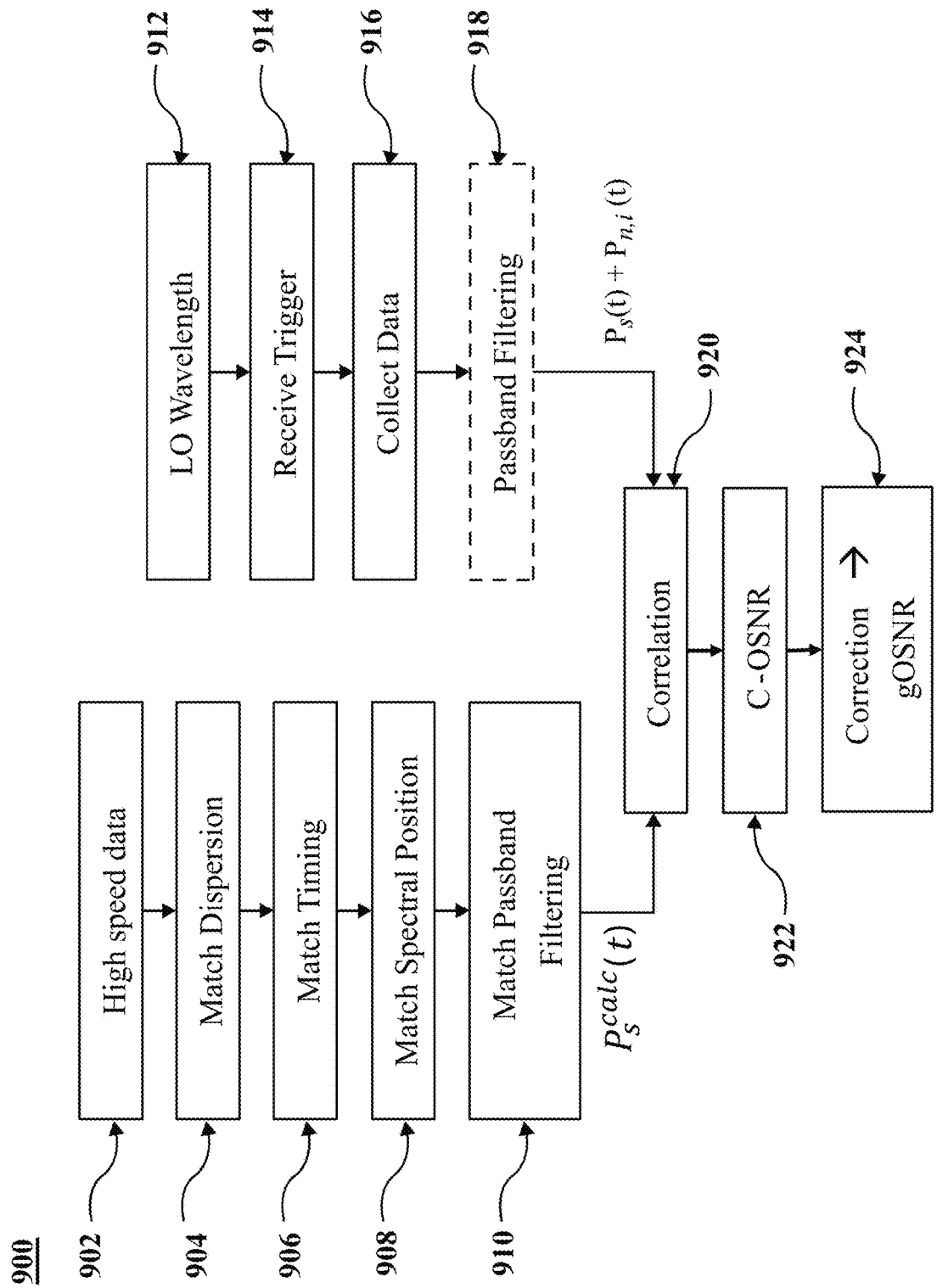
FIG. 9 illustrates a flowchart of a method for monitoring the gOSNR, in accordance with various non-limiting embodiments of the present disclosure.

FIG. 9 illustrates a flowchart of a process 900 representing a method for monitoring the gOSNR, in accordance with various non-limiting embodiments of the present disclosure. In certain non-limiting embodiments, the steps 902-910 of the process 900 may be implemented on the coherent transmitter 206 and the steps 912-924 may be implemented on the coherent OPM 400-4.

As shown, the process 900 may begin at step 902 where the coherent transmitter 206 may save high speed data associated with the portion of the real-time data signals. At step 904, the coherent transmitter 206 may match a dispersion of the high-speed data with the portion of the real-time data signals to be received by the coherent OPM 400-4. At step 906, the coherent transmitter 206 may match the timing of the high-speed data with the portion of the real-time data signals to be received by the coherent OPM 400-4. At step 908, the coherent transmitter 206 may match the spectral position of the high-speed data with the portion of the real-time data signals to be received by the coherent OPM 400-4. At step 910, the coherent transmitter 206 may match passband filtering of the high-speed data with the portion of the real-time data signals to be received by the coherent OPM 400-4 and generate band-pass signal. The coherent transmitter 206 may transmit the band-pass signal (having a power defined as $P_s^{calc}(t)$) in digital domain towards the coherent OPM 400-4 using the first communication channel 502-2.

At step 912, the coherent OPM 400-4 may tune the LO 402 to a desired wavelength and the LO 402 may generate LO signals to extract the portion of the real-time data signals transmitted by the coherent transmitter 206 over the optical fiber spans 212. At step 914, the coherent OPM 400-4 may receive a trigger from the node 102-1 to monitor the gOSNR of the real-time data signals on the optical fiber spans 212. The step 916, the coherent OPM 400-4 may extract the data from the portion of the real-time data signals. At step 918, the coherent OPM 400-4 may perform passband filtering on the extracted data and generate a processed data digital signal. The processed data digital signal may have a power defined as $P_s(t)+P_n(t)$. The power $P_s(t)$ may correspond to the portion of the real-time data signals and the power $P_n(t)$ may corresponds to the noise affecting the real-time data signals.

At step 920, the coherent OPM 400-4 may compute a correlation between the band-pass signal and the processed data digital signal. At step 922, the coherent OPM 400-4 may calculate OSNR based on the correlation between the band-pass signal and the processed data digital signal. Since, the calculated OSNR is for small portion of the real-time data signals, at step 924, the coherent OPM 400-4 may multiply the calculated OSNR with a predefined value to generalize the calculated OSNR to gOSNR.

The above discussed techniques where the gOSNR is computed based on the portion of the real-time data signals and the band-pass signal may extend the use of repeated signals block to online mode where real-time data may be transmitted over the optical fiber spans 212. The above discussed techniques may allow the monitoring of gOSNR by tuning the frequency of LO 402 of the coherent OPM 400-4.

Returning to FIG. 5, where the coherent transmitter 206 may still be operated in the online mode, in certain non-limiting embodiments, instead of receiving the band-pass signal from the coherent transmitter 206, the coherent OPM 400-4 may receive real-time data signals as a reference signal from another coherent OPM 400-3 via the second communication channel 504-1 to compute the correlation and gOSNR. The other coherent OPM 400-3 may be located closer to the coherent transmitter 206. Thus, there may be little or no noise in the captured signal at the other coherent OPM 400. It is to be noted that, this technique may not require to modify the reference signal from the other coherent OPM 400-3, thereby, further improving the operational performance of the optical network 100.

Also, the location of the other coherent OPM 400-3 may not be limited to be located close to the coherent transmitter 206. The coherent OPM 400-3 may be located downstream from the other coherent OPM 400-4. In case, the reference signal is generated in the middle of the updated link 500 link, then the computed gOSNR at the coherent OPM 400-4 may reflect the additional noises generated between two coherent OPMs 400-3 and 400-4. However, a quality of the computed gOSNR may still be better than when using the conventional techniques.

Figure 10:
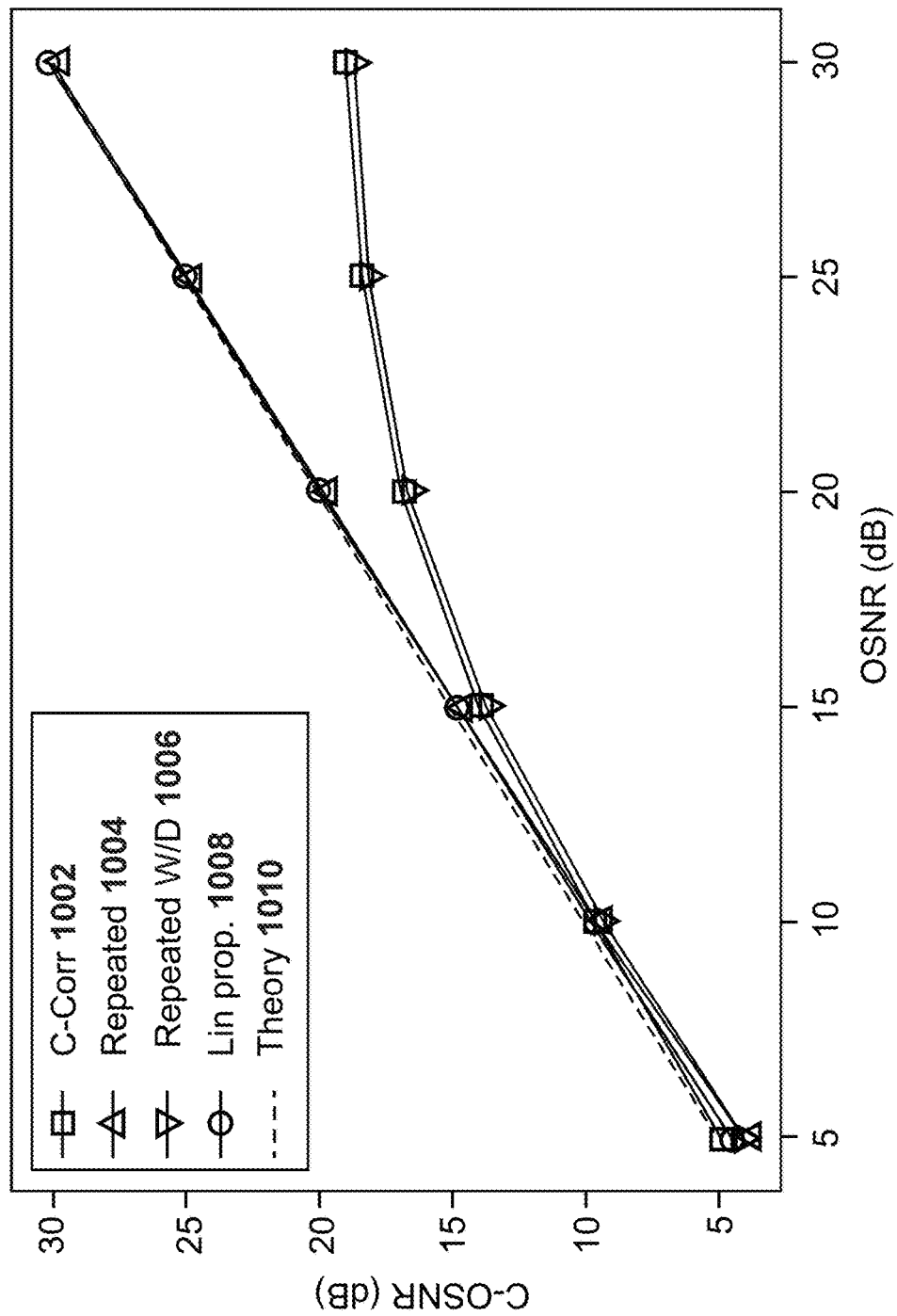
FIG. 10 illustrates simulated outcomes based on various techniques discussed in the present disclosure.

FIG. 10 illustrates simulated outcomes 1000 based on various techniques discussed in the present disclosure. As shown, the curve 1002 represents the OSNR calculated by a conventional technique with nonlinear propagation while the curve 1008 represents the linear propagation by setting the nonlinear coefficient of the fiber to zero. The calculated OSNR (C-OSNR) of linear propagation (curve 1008) overlaps with the curve 1010, which is the set OSNR, but the C-OSNR of nonlinear propagation (curve 1002), is showing the under estimation due to the SPM noise during the propagation. Similarly, the curve 1004, which is the C-OSNR calculated with identically repeated signals block 600 (as shown in FIG. 6A), shows overlap with set OSNR because the identically repeated signals block 600 have identical SPM noises but the curve 1006 which is the repeated signal blocks with added CD (as shown in FIG. 6B) successfully monitor the SPM and ASE noises.

Thus, by virtue of techniques discussed above, the gOSNR may be computed by using the single coherent OPM 400-4 at a particular location, thereby saving the additional hardware requirement to monitor gOSNR. Further, the techniques discussed above may monitor gOSNR at any frequency or spectral width of the signal spectrum which may allow monitoring gOSNR profile. Also, the techniques discussed above may monitor SPM noise separately with other noises.

Figure 11:
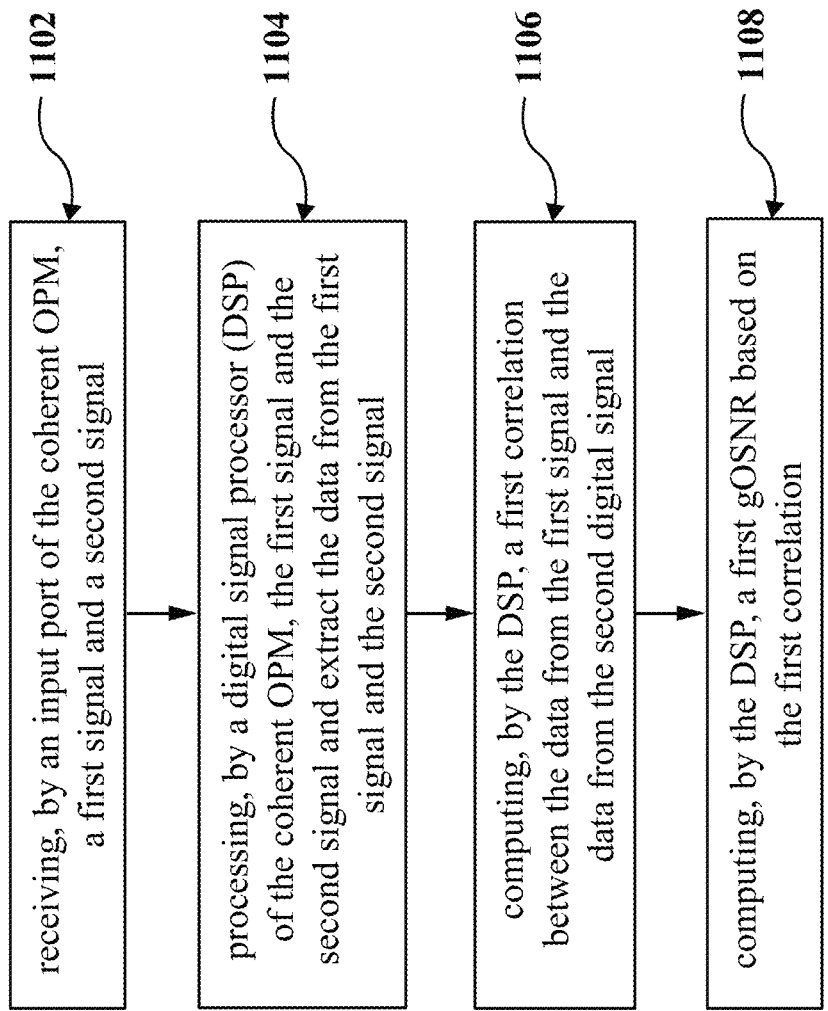
FIG. 11 illustrates another flowchart of a method for monitoring the gOSNR, in accordance with various non-limiting embodiments of the present disclosure.

FIG. 11 illustrates another flowchart of a process 1100 representing a method for monitoring the gOSNR, in accordance with various non-limiting embodiments of the present disclosure. The process 1100 commences at step 1102 where an input port of the coherent OPM receives a first signal and a second signal, wherein: the first signal and the second signal include same data, the first signal is an optical signal received from the optical channel, and the first signal is affected by a noise.

As previously noted, the input port 401 of the coherent OPM 400 may receive the first signal (e.g., 600-2), and the second signal (e.g. 600-3). The first signal and the second signal may include the same data. The first signal may be an optical signal received from the optical channel and the first signal is affected by the noise.

The process advances to step 1104 where a digital signal processor (DSP) of the coherent OPM, the first signal and the second signal and extract the data from the first signal and the second signal.

As noted previously, the DSP 414 of the coherent OPM 400 may process the first signal (e.g., 600-2) and the second signal (e.g., 600-3) and extract data from the first signal (e.g., 600-2) and the second signal (e.g., 600-3).

The process proceeds to step 1106 where the DSP computes a first correlation between the data from the first signal and the data from the second digital signal. As discussed above, the DSP 414 may compute the first correlation between the data from the first signal (e.g., 600-2) and the data from the second signal (e.g., 600-3).

Finally, at step 1108 the DSP computes a first gOSNR based on the first correlation. As noted above, the DSP 414 may compute the first gOSNR based on the first correlation.

It is to be understood that the operations and functionality of the coherent OPM 400 constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A coherent optical performance monitor (OPM) for monitoring generalized optical signal-to-noise ratio (gOSNR) of an optical channel, the coherent OPM comprising:
    an input port configured to receive a first signal and a second signal, wherein:
        the first signal and the second signal include same data,
        the first signal is an optical signal received from the optical channel, and
        the first signal is affected by a noise;
    a digital signal processor configured to:
        process the first signal and the second signal and extract the data from the first signal and the second signal;
        compute a first correlation between the data from the first signal and the data from the second signal; and
        compute a first gOSNR based on the first correlation.

2. The coherent OPM of claim 1, wherein the first signal and the second signal are received from the optical channel.

3. The coherent OPM of claim 1, wherein the first signal and the second signal are generated by a coherent transmitter operated in an offline mode.

4. The coherent OPM of claim 1, wherein the input port is further configured to receive a third signal, the third signal including the same data as that included in the first signal and the second signal, the third signal further includes a predefined chromatic dispersion (CD).

5. The coherent OPM of claim 4, wherein the processor is further configured to:
    remove the predefined CD from the third signal;
    extract the data from the third signal;
    compute a second correlation between the data from the first signal and the data from the third signal;
    compute a second gOSNR based on the second correlation; and
    compute a self-phase noise based on a difference between the first gOSNR and the second gOSNR.

6. The coherent OPM of claim 1, wherein the first signal and the second signal are generated by a coherent transmitter operated in an online mode.

7. The coherent OPM of claim 1, wherein the second signal is received from a coherent transmitter via a communication channel distinct from the optical channel.

8. The coherent OPM of claim 7, wherein the second signal is synchronised to the first signal.

9. The coherent OPM of claim 1, wherein the second signal is received from a second coherent OPM via a communication channel distinct from the optical channel.

10. The coherent OPM of claim 1, wherein the second signal is a digital signal.

11. The coherent OPM of claim 9, wherein the coherent OPM is located downstream from the second coherent OPM.

12. The coherent OPM of claim 1, wherein operational characteristics of the second signal including a timing, a data length, a spectrum position, a dispersion, and a passband response of the second signal are aligned to operational characteristics of the first signal.

13. A method for monitoring, by a coherent optical monitor (OPM), generalized optical signal-to-noise ratio (gOSNR) of an optical channel, the method comprising:
   receiving, by an input port of the coherent OPM, a first signal and a second signal, wherein:
      the first signal and the second signal include same data,
      the first signal is an optical signal received from the optical channel, and
      the first signal is affected by a noise;
   processing, by a digital signal processor (DSP) of the coherent OPM, the first signal and the second signal and extract the data from the first signal and the second signal;
   computing, by the DSP, a first correlation between the data from the first signal and the data from the second signal; and
   computing, by the DSP, a first gOSNR based on the first correlation.

14. The method of claim 13, wherein the first signal and the second signal are received from the optical channel.

15. The method of claim 13, wherein the first signal and the second signal are generated by a coherent transmitter operated in an offline mode.

16. The method of claim 13 further comprises receiving, by the input port, a third signal, the third signal including the same data as that included in the first signal and the second signal, the third signal further includes a predefined chromatic dispersion (CD).

17. The method of claim 16 further comprises:
   removing, by the DSP, the predefined CD from the third signal;
   extracting, by the DSP, the data from the third signal;
   computing, by the DSP, a second correlation between the data from the first signal and the data from the third signal;
   computing, by the DSP, a second gOSNR based on the second correlation; and
   computing, by the DSP, a self-phase noise based on a difference between the first gOSNR and the second gOSNR.

18. The method of claim 13, wherein the first signal and the second signal are generated by a coherent transmitter operated in an online mode.

19. The method of claim 13, wherein the second signal is received from a coherent transmitter via a communication channel distinct from the optical channel.

20. The method of claim 19, wherein the second signal is synchronised to the first signal.

21. The method of claim 13, wherein the second signal is received from a second coherent OPM via a communication channel distinct from the optical channel.

22. The method of claim 13, wherein the second signal is a digital signal.

23. The method of claim 13, wherein operational characteristics of the second signal, including a timing, a data length, a spectrum position, a dispersion, and a passband response of the second signal, are aligned to operational characteristics of the first signal.

* * * * *